United States Patent [19]

Ishizaka et al.

[11] Patent Number: 4,624,540
[45] Date of Patent: Nov. 25, 1986

[54] FILM SPEED SETTING DEVICE FOR CAMERA

[75] Inventors: Sunao Ishizaka; Osamu Maida, both of Tokyo, Japan

[73] Assignee: Nippon Kogaku K. K., Tokyo, Japan

[21] Appl. No.: 709,299

[22] Filed: Mar. 7, 1985

[30] Foreign Application Priority Data

Mar. 12, 1984 [JP] Japan ................................. 59-46865

[51] Int. Cl.⁴ ......................... G03B 7/24; G03B 17/18
[52] U.S. Cl. .................................... 354/21; 354/289.1
[58] Field of Search .................. 354/21, 289.1, 289.12; 352/78 C

[56] References Cited

U.S. PATENT DOCUMENTS

| 4,173,401 | 11/1979 | Harvey | 354/21 |
| 4,200,371 | 4/1980 | Suzuki et al. | 354/21 |
| 4,512,643 | 4/1985 | Tokuda | 354/21 |
| 4,538,890 | 9/1985 | Ishizaka et al. | 354/21 |

Primary Examiner—William B. Perkey
Attorney, Agent, or Firm—Shapiro and Shapiro

[57] ABSTRACT

A camera is capable of using a film cartridge bearing code indicia indicating the film speed of the film contained in the cartridge. The camera comprises first means for detecting the film speed from the code indicia of the film cartridge loaded in the camera and generating a first corresponding signal, and second means for manually setting the film speed and generating a second corresponding signal. The camera further comprises discriminator means connected to the first and second means and adapted to generate an output signal upon detection that neither the first nor the second signal is generated, and means for generating an alarm in response to the output signal of the discriminator means.

3 Claims, 6 Drawing Figures

FILM SPEED SETTING DEVICE FOR CAMERA

BACKGROUND OF THE INVENTION

1. Field of the Invention

The present invention relates to a film speed setting device for use in a photographic camera.

2. Description of the Prior Art

There is already proposed, for example in the U.S. Pat. Nos. 4,024,557 and 4,173,401, a system in which a digital code or indicia representing the film speed is formed on the film cartridge or magazine and is automatically detected by a detecting device provided in the camera. Such system is extremely effective in preventing the problem of erroneous setting of the film speed through an error of the operator. Also the U.S. Pat. No. 4,200,371 discloses a camera in which the film speed setting dial has an automatic setting position and is to be set at this position when a film cartridge having the digital code or indicia is used. More specifically, the system of said prior art is capable of automatically setting the film speed when a film cartridge bearing the digital code is loaded, or giving a suitable alarm to instruct the operator to move said film speed setting dial to a suitable manual position and simultaneously locking the shutter release button in case a film cartridge lacking the digital code is loaded while the setting dial is placed at the automatic film speed setting position. It is also proposed to give an alarm and to lock the shutter release button for preventing an error, in case a film cartridge with the digital code for example for a film speed of ISO 400 is loaded while the setting dial is placed at a manual position for example for a film speed of ISO 100.

However certain operators may wish to obtain a particular effect in the modified graininess by a push development of a film of ISO 100 to a speed of ISO 400, and the locking of the shutter release button is a rather unwelcome measure for such operators.

SUMMARY OF THE INVENTION

In consideration of the foregoing, an object of the present invention is to provide a film speed setting device capable of effective functions in various photographing modes.

Another object of the present invention is to provide a camera which is free from the danger of unsuitable photographing caused by erroneous film speed setting in case a film cartridge with a digital code is loaded while the film speed setting dial is placed at the automatic film speed setting position, and which gives flashing alarms in the indicators in the view finder and on the camera for instructing the operator to effect a manual setting of the dial and locks the shutter release button, in case a film cartridge lacking the digital code is loaded.

In case a film cartridge with a digital code for a certain film speed is loaded while the setting dial is placed at a manual position for a different film speed, the system lights an indicator in the view finder to instruct the operator of such situation but does not lock the shutter release button in consideration of a possible particular intention of the operator such as the push development of the film, whereby the operator can be released from the burden of film speed setting.

DESCRIPTION OF THE PREFERRED EMBODIMENTS

Figure 1:
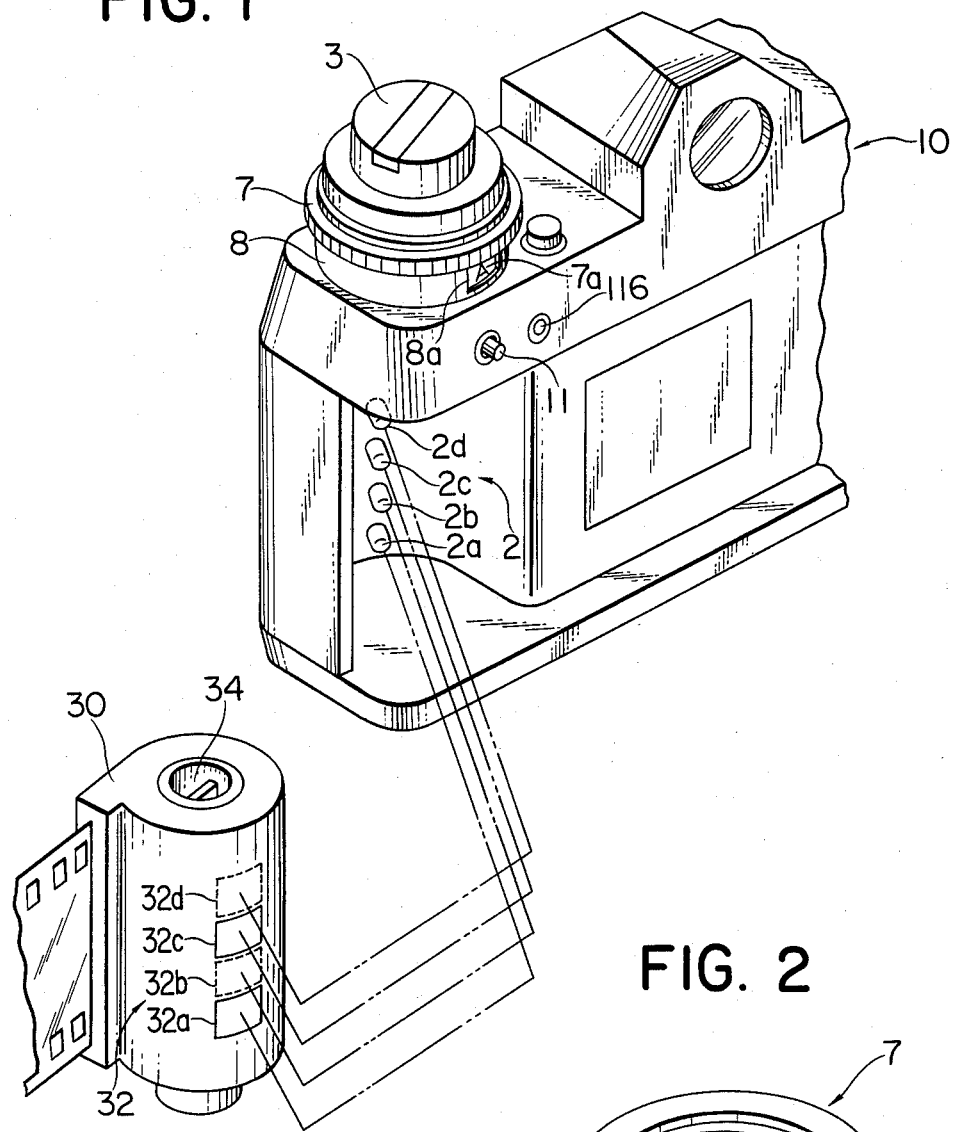
FIG. 1 is a perspective view of an embodiment of the present invention.

FIG. 1 shows a schematic entire view of an embodiment of the present invention, wherein a film cartridge 30 is laterally provided with an encoded information pattern 32, while a film chamber of a camera 10 is provided with contact pins 2 in a position corresponding to the pattern when the film cartridge is loaded in the film chamber. An area 32a the pattern 32 on the film cartridge constitutes a conductive grounding contact commonly present in various bearing such code patterns, while other areas 32d–32d constitutes a 3-bit digital code by combinations of conductive areas and non-conductive areas covered by an insulating paint. All the areas constituting the 3-bit code cannot be non-conductive at the same time in the film cartridges bearing the code pattern, but, in the film cartridges lacking the code pattern, all the areas corresponding to the pattern are rendered non-conductive.

Figure 2:
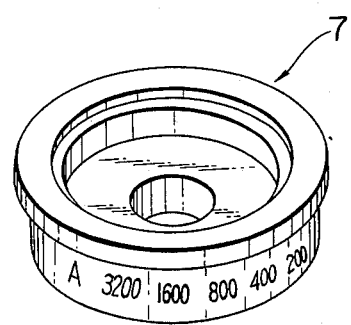
FIG. 2 is a perspective view of a film speed setting dial.

On the camera 10 there is provided a knob 3 for rewinding the film extracted from a spool 34 of the film cartridge, by rotating a shaft 13 to be coupled with the spool 34. Around the shaft 13 there is provided a film speed setting dial 7, around which are marked figures "100", "200" etc. indicating the film speeds and a symbol "A" indicating the automatic film speed setting mode as shown in FIG. 2, one of the figures and mark being displayed through a window 8a of a fixed ring 8. On the camera 10 there are also provided an operating button 11 and a display unit 116 composed of a light-emitting diode.

Figure 3:
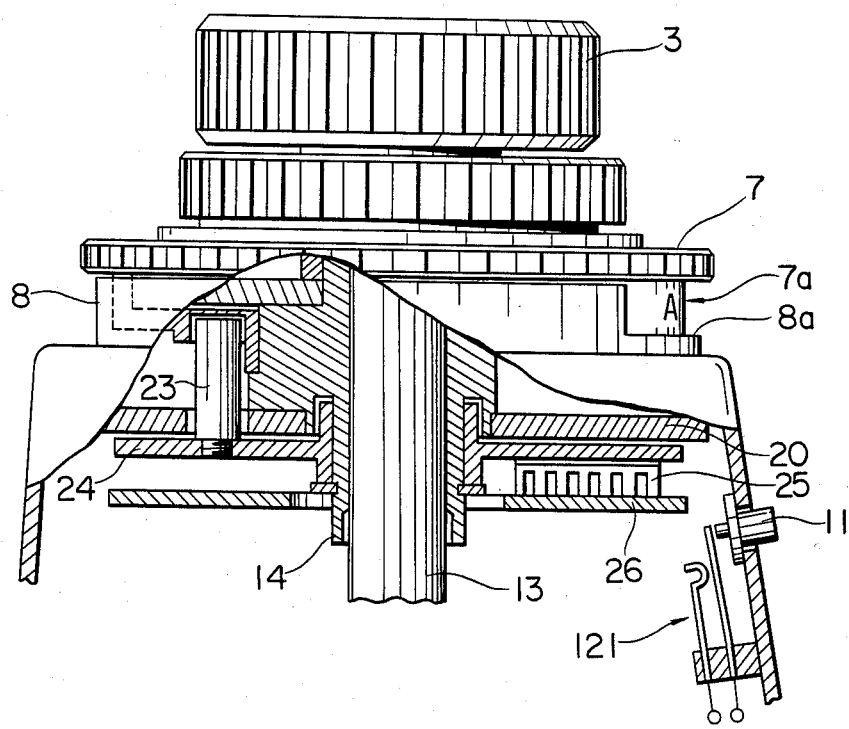
FIG. 3 is a partially sectional view of an operation unit of FIG. 1.

FIG. 3 shows the cross section of the operating unit, wherein a bearing 14 fixed on a base plate 20 supports the rewinding shaft 13 which is integral with the knob 3. On a circular substrate 26 fixed in the camera around the bearing 14, there are provided coaxial conductor patterns composed of gray codes or electric resistors for generating digital or analog output signals corresponding to the position of the setting dial 7, and brushes 25 integrally rotating with a rotary disk 24 output information of a film speed or the selection of the automatic film speed setting mode. The rotary disk 24 is coupled integrally with the setting dial 7 in the rotating direction by means of a pin 23. The operating button 11 actuates a switch 121.

Figure 4:
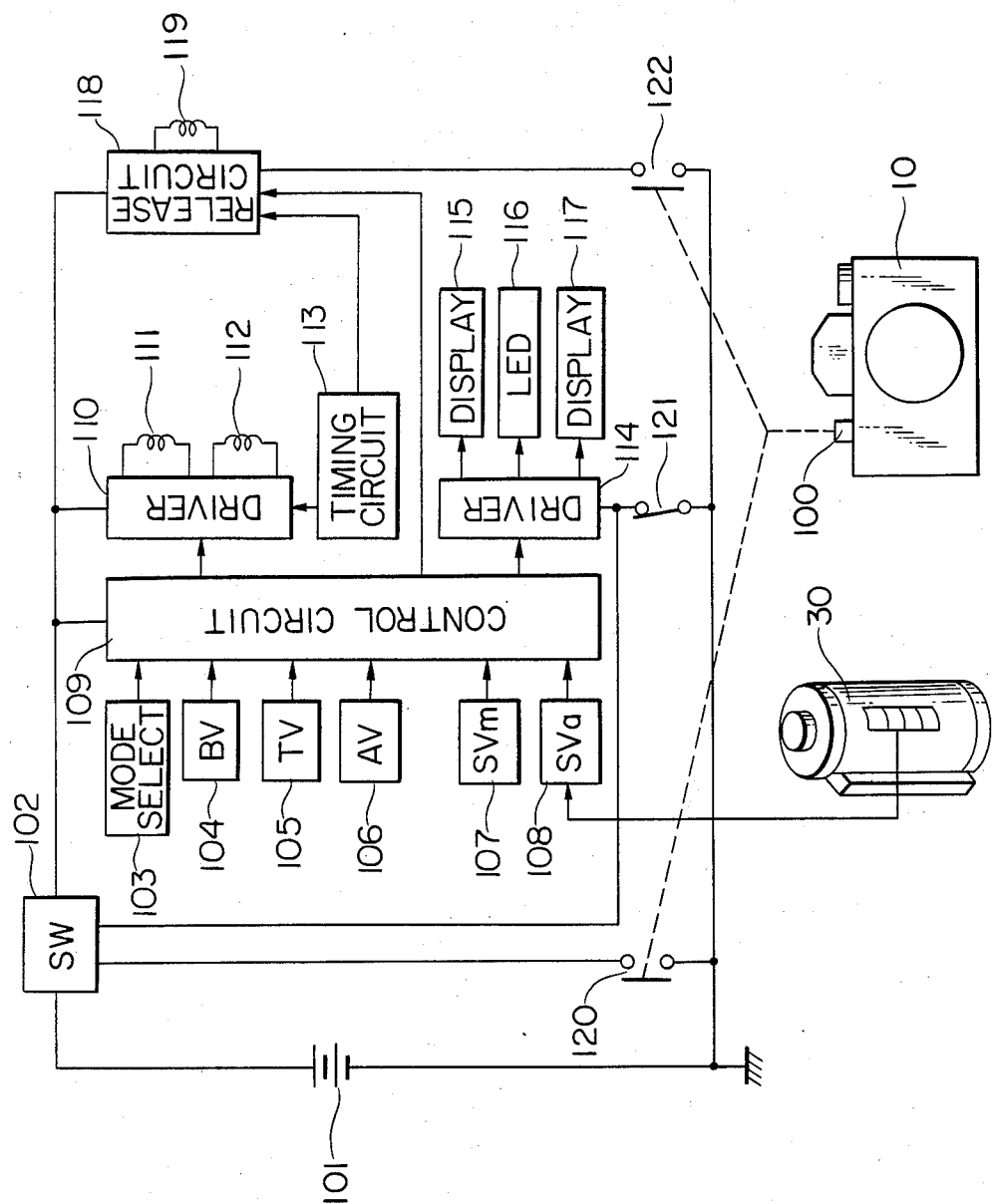
FIG. 4 is a block diagram showing an example of an electric circuit according to the invention.

FIG. 4 shows an example of the electric circuit of a control unit. Power supply from a power source 101 to the present device is controlled by a switching circuit 102 composed for example of transistors. The switching circuit 102 is in turn controlled by a power switch 120 to be closed by a first downward stroke of a shutter release button 100 of the camera, or by a switch 121 to be closed by the operating button 11. A control circuit 109 receives an output signal BV from a circuit 104 corresponding to the luminance value of an object, an output signal TV from a circuit 105 corresponding to the time value, and an output signal AV from a circuit 106 corresponding to the aperture value. Also output signals from circuits 107, 108 corresponding to the film speed value are supplied to the control circuit 109. Circuit 107 includes the brushes 25 and conductor patterns on the substrate 26 and supplies the control circuit 109 with an electrical signal SVm obtained by conversion of the film speed set by the dial 7. Circuit 108, including the aforementioned contact pins 2, converts the film speed represented by the digital code pattern on the film cartridge into an electrical signal SVa similar to the signal SVm and supplies this converted signal to the control circuit 109.

Either one of electrical signals SVm, SVa is selectively used in the calculation of the exposure, and the selection of the signals is effected in relation to the manipulation of the setting dial 7. In the automatic mode in which the dial 7 is so positioned that the symbol "A" appears in the window 8a, the output signal Sva of the circuit 108 alone is transmitted to the control circuit 109 while the output signal SVm of the circuit 107 is not transmitted. However, if a film cartridge lacking the digital code pattern is loaded, the signal SVa is not transmitted either. On the other hand, in the manual mode in which the dial 7 is so rotated that a figure such as "100" or "200" indicating the film speed appears in the window 8a, the output signal SVm of the circuit 107 is supplied to the control circuit 109. In this state, if a film cartridge bearing the digital code pattern is loaded in the camera, both electrical signals SVm and SVa are supplied to the control circuit 109.

The function mode of the control circuit 109 varies according to the output signal of a selecting circuit 103 to be manipulated for selecting the photographing modes. As an example, in case the selecting circuit 103 selects the aperture priority shutter speed control mode, there is generated a signal for obtaining an adequate shutter speed in response to the signals BV, AV and SVm (SVa). On the other hand, when the shutter-speed priority aperture control mode is selected, there is generated a signal for obtaining an adequate aperture value in response to the signals Bv, TV and SVm (SVa). When the program mode is selected, there is generated a signal for obtaining an adequate shutter speed and an adequate aperture value according to a predetermined program and in response to the signals Bv and SVm (SVa). The output signal of the control circuit 109 is supplied to a solenoid driving circuit 110 to energize a shutter control solenoid 111 and/or an aperture control solenoid 112. In the aperture priority shutter speed control mode mentioned above, the energizing period of the solenoid 111 retaining the trailing curtain of the shutter is controlled by the output signal of the control circuit 109 through the driving circuit 110. The aperture control solenoid 112 so functions to terminate the closing of the aperture in response to the output signal from the control circuit 109, when a desired aperture value is reached in the course of mechanical closing of the aperture immediately after the start of a photograph-taking operation. The solenoid driving circuit 110 performing these functions has only to function in the photographing sequence of the camera and need not function for example when the operator confirms the information of exposure through a display in the camera. The function of the circuit 110 is therefore controlled by a timing circuit 113 equipped with switches respectively responding to the various timings of the camera function. As an example, the solenoid 111 is energized immediately prior to the elevation of a known quick-return mirror and the start of a leading curtain of the shutter.

Another output signal of the control circuit 109 is transmitted to the display driving circuit 114. A display unit 115 composed of a liquid crystal display indicates the shutter speed, aperture value and film speed in the view finder, while the light-emitting diode 116 shown in FIG. 1 is lighted as an alarm when the film speed setting is inadequate, and a display unit 117 having patterns composed for example of light-emitting diodes is lighted when the signals SVa and SVm are mutually different, i.e. when the actual film speed is different from that selected by the dial 7, and flickers when neither the signal SVa nor SVm is entered, thus giving alarms in the view finder.

The switch 121 shown in FIG. 3 and connected to the display driving circuit 114 is adapted to shift, when closed, the display unit 115 to the display of film speed instead of shutter speed and aperture value. A shutter release circuit 118 energizes a solenoid 119 by means of a switch 122 to be closed in a second downward stroke of the shutter release button, thus initiating the photographing sequence of the camera. The signal from the timing circuit 113 interrupts the energization of the solenoid 119, and, in practice, includes a signal from (a not shown) switch responding to the film advancement of each exposure frame, thus preventing the shutter release operation when the film advancement is not completed. In case the dial 7 is set to the automatic setting mode when a film cartridge lacking the digital code is loaded in the camera, the control circuit 109 supplies a signal to the shutter release circuit 118, thus locking the shutter release button in order to avoid erroneous exposure.

Figure 5:
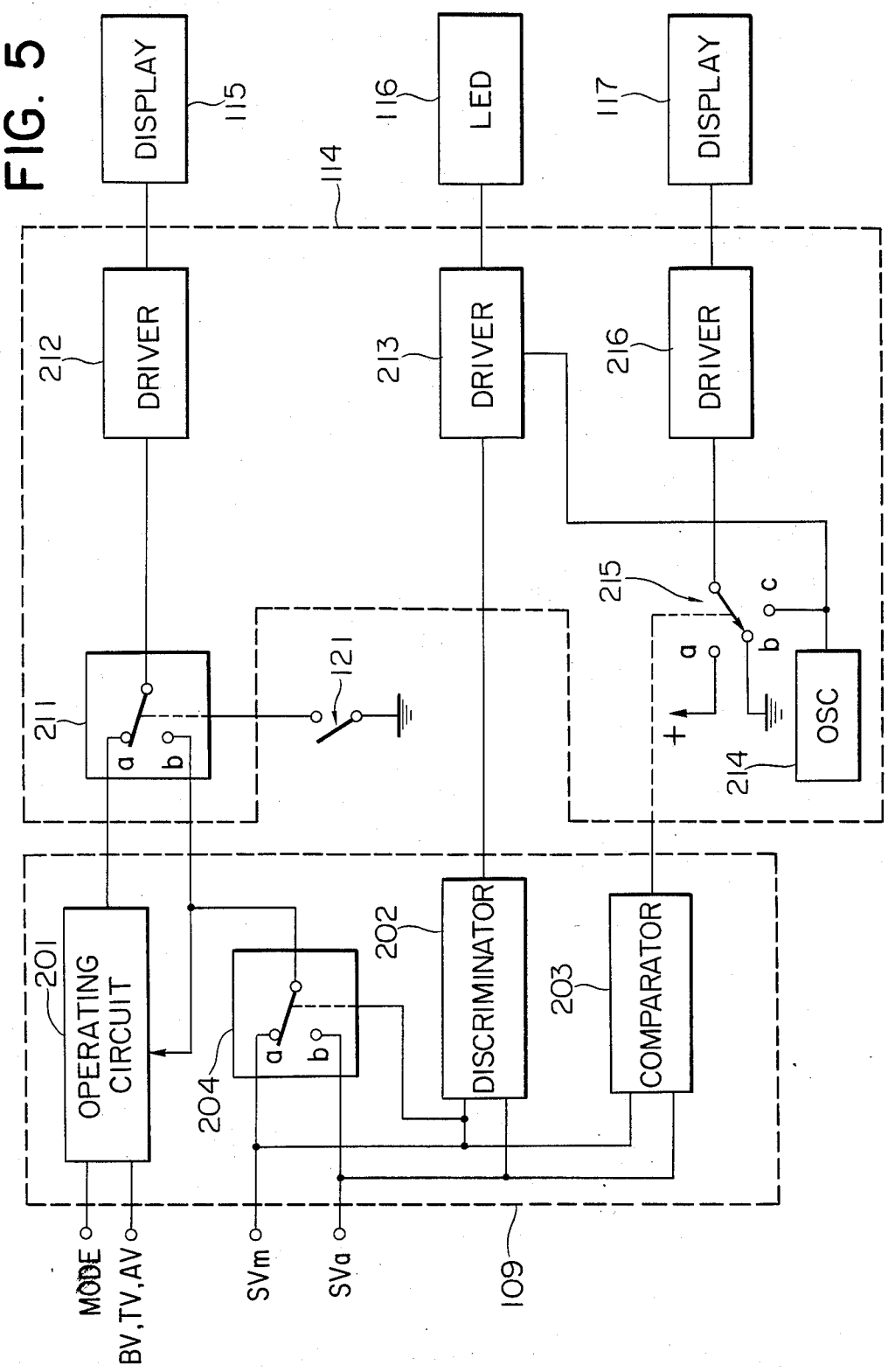
FIG. 5 is a block diagram showing the details of a control circuit and a display driving circuit shown in FIG. 4.

FIG. 5 shows more detailed structure of the control circuit 109 and the display driving circuit 114. The control circuit 109 comprises an operating circuit 201 for obtaining the exposure information, i.e. shutter speed and/or aperture value to be controlled in response to the signals BV, TV and AV from the circuits 104, 105 and 106; a discriminator 202 for generating a discrimination output signal according to the status of the signals SVm and SVa from the circuits 107, 108; a comparator 203 for comparing said signals SVm and SVa; and a switch 204 having a contact a connected to the circuit 107, a contact b connected to the circuit 108, and a contactor for selecting said contact a when the signal SVm is generated, i.e. when the dial 7 selects the manual mode.

The display driving circuit 114 comprises a selector switch 211 having a contact a connected to the operating circuit 201, a contact b connected to the switch 204 and a contactor to be shifted from the contact a to b in response to the closing of the switch 121; a driver 212 for driving the display unit 115 according to the information selected by the selector switch 211; a driver 213 for driving the light-emitting diode 116 in response to the signal from the discriminator 202; a selector switch 215 having a contact a connected to a voltage source, a grounded contact b, a contact c connected to an oscillator 214, and a contactor to be shifted in response to the output signal from the comparator 203; and a driver 216 for driving the display unit 117 in response to the output signal selected by the selector switch 215.

Figure 6:
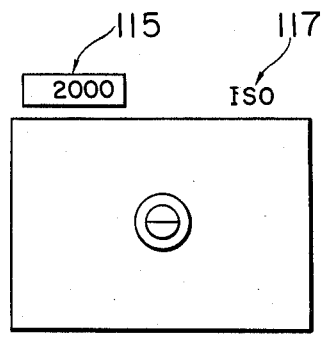
FIG. 6 is a schematic view showing the arrangement of indicators in the view finder.

FIG. 6 shows an example of display in the view finder, wherein the display unit 115 numerically displays the film speed instead of the exposure information, when the switch 121 is closed by the actuation of the button 11 as explained in the foregoing, while the display unit 117 has three display modes of "on", "flickering" and "off".

The function of the display units 115-117 is as follows. In the first downward stroke of the shutter button, the switch 120 is closed to render switching means 102 conductive a whereby the display units are enabled for display. In the normal state the exposure information such as shutter speed and aperture value is transmitted from the operating circuit 201 to the display driving circuit 114 and is displayed by the display unit 115. When the button 11 is depressed in this state, the switch 121 is closed to shift the selector switch 211 to the contact b, whereby the information on the film speed (SVm or SVa) is transmitted to the driver 212 and displayed on the display unit 115 instead of the exposure information. Also when the button 11 is depressed after the shutter release button is released, the switch 121 is closed to close the switching means 102, so that the film speed is displayed on the display unit 115.

When the operating circuit 109 receives the signals SVm and SVa, namely when the dial 7 is set at the manual mode and a film cartridge bearing the code pattern is loaded in the camera, the selector switch 204 selects the contact a whereby the signal SVm is preferentially supplied to the display driving circuit 114 and displayed on the display unit 115.

The display 116 is independent from the switch 121. In case the dial 7 is set to the automatic mode and a film cartridge lacking the code pattern is loaded in the camera, the circuits 107, 108 do not generate the signals SVm, SVa, whereby the discriminator 202 generates a high-level output signal and the driver 213, responding to the output of the oscillator 214, causes the light-emitting diode 116 to flicker.

On the other hand, in case the dial 7 is set to the manual mode and/or a film cartridge bearing the code pattern is loaded in the camera, the circuits 107, 108 generate the signal SVm and/or Sva, whereby the discriminator 202 generates a low-level output signal to turn off the light-emitting diode 116.

The display unit 117 is also independent from the switch 121. In case the dial 7 is set to the manual mode and a film cartridge bearing the code pattern is loaded in the camera, namely when the signals SVm, Sva are both generated by the circuits 107, 108, the comparator 203 compares the signals. If signals SVm, SVa are mutually different, the comparator generates a first output signal, in response to which the switch 215 selects the contact a to turn on the display unit 117. On the other hand, in case the automatic mode is selected and a film cartridge lacking the code pattern is loaded in the camera namely when the signals SVm, SVa are not generated by the circuits 107, 108, the comparator 203 generates a second output signal, in response to which the switch 215 selects the contact c, thus causing the display unit 117 to flicker. In all other cases the comparator 203 generates a third output signal, in response to which the switch 215 selects the contact b to turn off the display unit 117.

In case the dial 7 is set to the automatic mode and a film cartridge bearing the code pattern is loaded in the camera, the signal SVa is supplied to the control circuit 109. The operator can confirm the automatically set film speed SVa, as the display of the display unit 115 in the view finder is switched from the exposure information to the film speed when the button 11 is depressed.

On the other hand, in case a film cartridge lacking the code pattern is loaded in the camera in the automatic mode, the shutter release button is locked, and the display unit 117 in the view finder and the light-emitting diode 116 provided outside of the camera flicker to give a warning to the operator. When the dial 7 is set at the manual mode, the corresponding signal SVm is supplied to the control circuit in preference to the film speed signal SVa. In case, however, signals SVm and SVa are mutually different, the display unit 117 in the view finder alone is lighted. If the difference between SVm and SVa is due to an erroneous setting of the operator, he will notice it by the lighting of the display unit 117 and will be able to prevent erroneous photographing. On the other hand, if the signal SVm is intentionally set differently, the operator can perform the photographing operation, disregarding the lighting of the display unit. In this state the signal SVm is displayed on the display unit 115 in the view finder by the depression of the button 11. In these situations the external light-emitting diode 116 does not perform any function and will not therefore hinder the photographing operation nor aggravate the battery consumption.

In case a film cartridge lacking the code pattern is loaded in the camera while the manual mode is selected, the display units 116, 117 do not function, and the control circuit 109 receives the manually set film speed SVm.

What is claimed is:

1. A camera capable of using a film cartridge bearing code indicia indicating a film speed of a film contained in said cartridge, comprising:
    (a) first means for detecting said film speed from said code indicia of said film cartridge loaded in said camera and generating a first corresponding signal;
    (b) second means for manually setting the film speed and generating a second corresponding signal;
    (c) means connected to said first and second means and adapted to produce a first alarm output when neither said first nor said second signal is generated and to produce a second alarm output when both said first and second signals are generated and when the film speed corresponding to said first signal and the film speed corresponding to said second signal are mutually different; and
    (d) alarm means including means for preventing the operation of said camera for photography and display means having a first display state and a second display state different from said first display state, said alarm means further including means for driving said preventing means and said display means in said first display state in response to said first alarm output and for driving said display means in said second display state in response to said second alarm output.

2. A camera according to claim 1 further comprising another display means connected to said first and second means and adapted to display a corresponding film speed when at least either one of said first and second signals is generated, wherein said another display means comprises means for selecting said second signal when both said first and said second signals are generated.

3. A camera according to claim 1 further comprising means for controlling an exposure of said film, based on said second signal when both said first and said second signals are generated.

* * * * *